Figure 1:
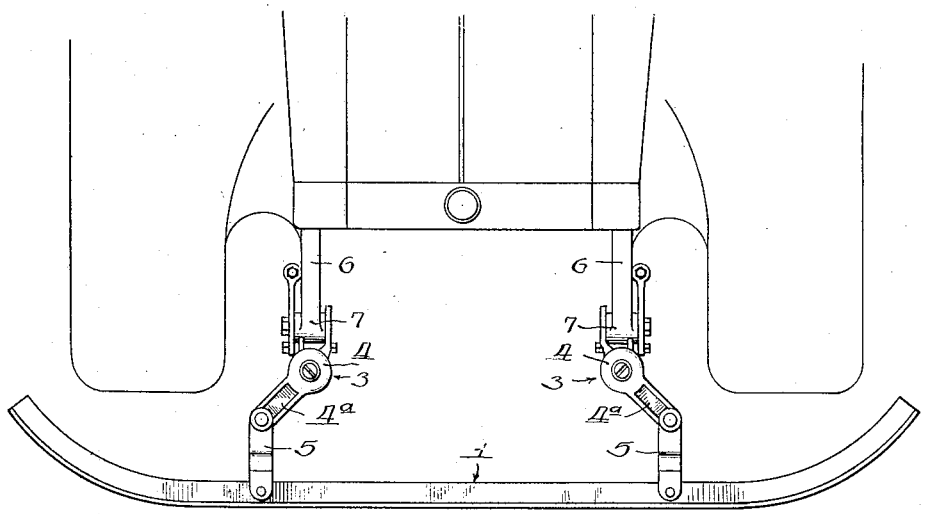

L. BAUMGARTL.
AUTOMOBILE BUMPER.
APPLICATION FILED JAN. 31, 1921.

1,372,737.

Patented Mar. 29, 1921.

2 SHEETS—SHEET 1.

Inventor,
Leroy Baumgartl,
By Offield, Towle & Linthicum Attys

L. BAUMGARTL.
AUTOMOBILE BUMPER.
APPLICATION FILED JAN. 31, 1921.

1,372,737.

Patented Mar. 29, 1921.

2 SHEETS—SHEET 2.

Inventor
Leroy Baumgartl,
By Offield, Poole & Huston, Attys.

UNITED STATES PATENT OFFICE.

LEROY BAUMGARTL, OF CHICAGO, ILLINOIS.

AUTOMOBILE-BUMPER.

1,372,737. Specification of Letters Patent. Patented Mar. 29, 1921.

Application filed January 31, 1921. Serial No. 441,147.

*To all whom it may concern:*

Be it known that I, LEROY BAUMGARTL, a citizen of the United States, and a resident of Chicago, in the county of Cook and State of Illinois, have invented certain new and useful Improvements in Automobile-Bumpers, of which the following is a specification.

This invention relates to improvements in automobile bumpers, and more particularly to means whereby the same is attached to the frame members of a motor vehicle. To distinguish the several parts of an automobile bumper, the parts constituting the means for attaching a bumper to the vehicle frame are conveniently termed brackets, and serve to support the impact bar and other members associated therewith.

The particular type of bumper herein disclosed as embodying the bracket, to which the present invention relates, involves the adaptation of a torsional spring as a shock absorbing member, interposed between the impact bar and the vehicle frame. Such an arrangement necessitates the use of a housing or cylinder which may be generally termed a supporting member, this supporting member having direct connection with the vehicle frame through the medium of the bracket constituting the subject matter of the invention. The general features of construction of a bumper such as just described, are completely disclosed in a patent granted to me on July 13, 1920, and bearing No. 1,346,478.

The problem of mounting a bumper upon a motor vehicle is frequently a difficult one, owing to the fact that in different makes of motor vehicles, the dimensions of the frame members at the point of attachment vary in a considerable degree. It is therefore desirable in designing a bracket to fit the various makes of motor vehicles, to include certain degree of adjustability in all directions, combined with simplicity in the method of attachment, so that a bracket may be easily and quickly attached without drilling or cutting the frame members, thus weakening or otherwise mutilating the same.

The object of the present invention is therefore to combine the desirable features above indicated, in a construction for an attachment bracket, and one that is adaptable to a large number of makes of motor vehicles, as well as various makes of bumpers.

Figure 2:
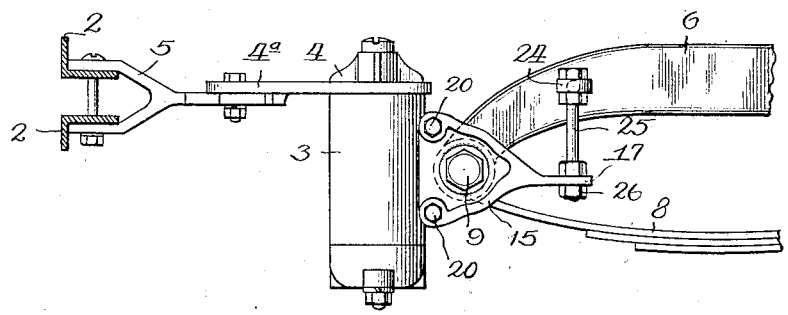
Figure 3:
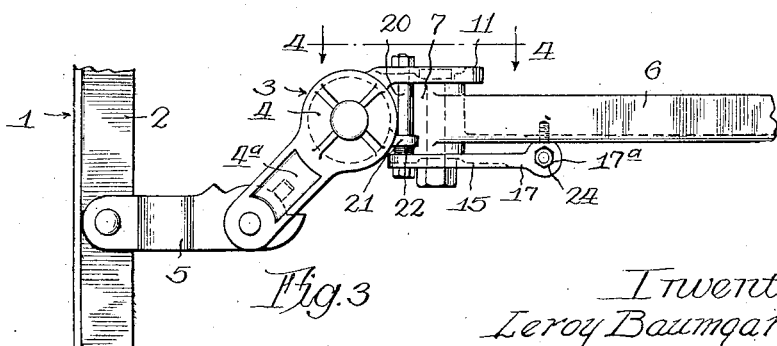
Figure 4:
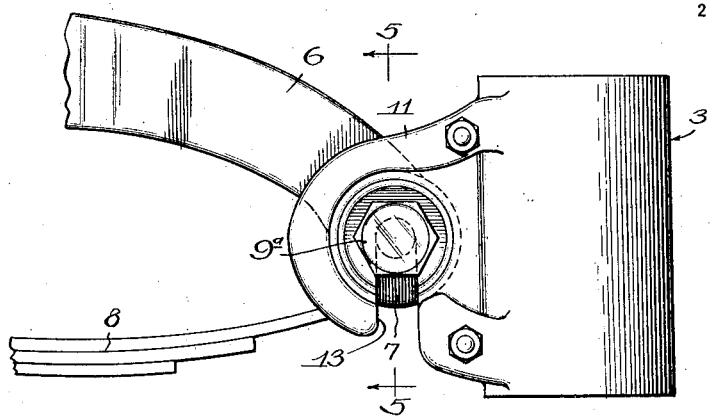
Figure 5:
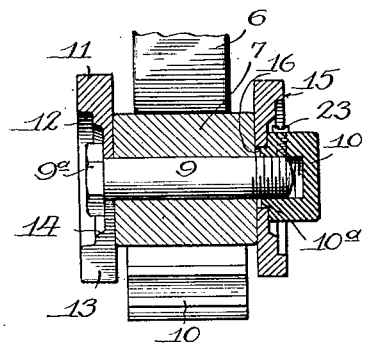
Figure 6:
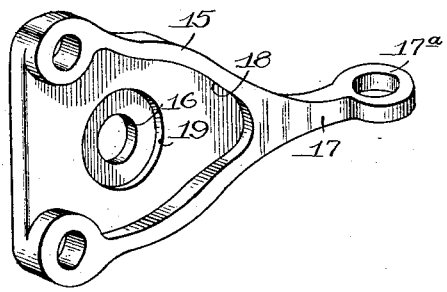
Figure 7:
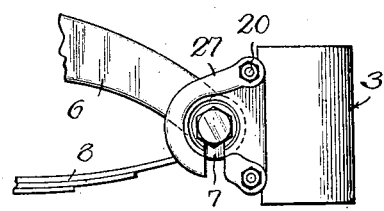
Figure 9:
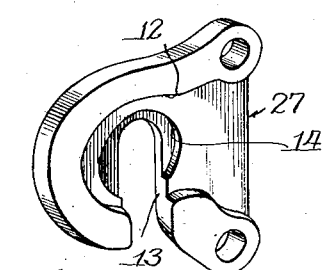
Figure 8:
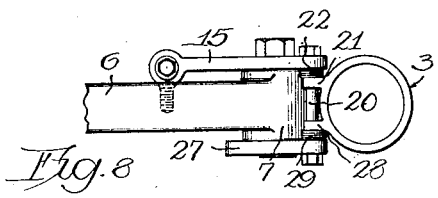

In the accompanying drawings, the type of bumper hereinbefore described is selected as a preferable construction to disclose the novel features of the attaching bracket. The several illustrations of the drawings may be briefly described as follows:

Figure 1 is a top plan view of the forward portion of a motor vehicle, showing a complete bumper structure mounted upon the frame members thereof, Fig. 2 is a view in side elevation of a supporting member carrying the impact bar, and itself directly connected to the vehicle frame member by means of the attaching bracket, Fig. 3 is a top plan view of the parts shown in Fig. 2, Fig. 4 is an enlarged detailed view in side elevation as taken from the line 4—4 of Fig. 3, Fig. 5 is an enlarged view in vertical section taken on line 5—5 of Fig. 4, Fig. 6 is an enlarged view in perspective of the adjustable plate of the attaching bracket, and shown as completely removed therefrom, Fig. 7 is a view in side elevation corresponding to Fig. 4, and showing a modified construction of the bracket, Fig. 8 is a top plan view of the modified form of bracket illustrated in Fig. 7, and Fig. 9 is an enlarged view in perspective of the companion plate to that shown in Fig. 6 and illustrating its construction as employed in the modified type of bracket disclosed in Figs. 7 and 8.

A bumper embodying the invention, comprises in general an impact member 1, consisting of two vertically spaced bars 2—2 of L-section extending throughout the length of the impact member, these bars being joined together at their ends and at suitable points intermediate their ends by means of spacing blocks not shown. Supporting the impact member 1 in horizontal position and forwardly of the vehicle, are two vertically disposed cylinders 3—3, these cylinders inclosing the torsional springs hereinbefore referred to, but not illustrated, and further comprising rotative caps 4—4 at their upper ends, these caps being provided with integral arms $4^a$—$4^a$ extending forwardly and connected with the impact member 1 through the medium of links 5—5, having pivotal connection with the ends of the arms $4^a$—$4^a$, and with the impact member. It is not deemed necessary to describe in detail the construction of the cylinders 3—3, inasmuch as such a description would have no bearing upon the function of the attaching brackets. However, the action of the bumper may be described with advantage. In the event that a blow is received against the impact member, the force is transmitted to the torsion springs inclosed within the cylinders 3—3 through the medium of the links 5—5 and the rotative caps 4—4, the latter being rotated under the force of the impact in a direction to increase the torsional resistance offered by the springs. In this manner, the impact is absorbed without being transmitted with injurious results to the frame of the vehicle.

Referring now to the construction of the attaching brackets, it is to be understood that the cylinders or supporting members, as they may be conveniently termed for the purpose of the following description, may be any members which are interposed between the impact member and the attaching brackets. To describe one of the brackets in a general way, it may be said to consist of two plates extending rearwardly from the supporting member 3, and straddle the end of the frame member 6 of the vehicle, the latter being of the usual construction; namely, a channel bar terminating in a downwardly curved and slightly tapered end portion having an enlarged cylindric head 7. Connected with the end of the frame member 6 is a leaf spring 8 having direct connection with the frame head 7 by means of a pivot or spring bolt 9 extending transversely through the head 7, this bolt having an integral head 9ª at one end, and a removable nut 10 at the opposite end.

As before suggested, the bracket straddles the end of the frame member 6, and more particularly the head 7 thereof, thus suggesting two laterally spaced members or parts which may be termed "plates." As a preferable construction, one of the plates 11; namely, the one located at the inner side of the frame head 7, has the form of an ear integral with the supporting member or cylinder 3, and as clearly shown in Fig. 4, is somewhat triangular in shape and extends rearwardly, its base cast in substantially tangential relation to the surface of the cylinder. This construction is resorted to in order that the cylinder may be disposed immediately in front of the frame head 7. The central portion of this integral plate is considerably reduced in thickness by the provision of a recess 12 following the general contour of the plate, and producing the effect of a reinforcing bead surrounding the margin thereof. Extending from the center of the plate 11, and in a vertical and downward direction, is formed an open slot 13, (Fig. 4 and 5), the outer surface of the plate immediately surrounding the upper end of the slot being further reduced in thickness by the provision of an annular depression 14, as clearly shown in Fig. 5. This annular depression 14 is adapted to receive the head 9ª of the pivot bolt 9 when the cylinder 3 together with the integral plate 11 is suspended from the pivot bolt by passing the open slot 13 downwardly over the shank of the pivot bolt, between the head 9ª thereof, and the frame head 7. In this manner, the thickness of metal actually retained between the bolt head 9ª and the frame head 7 is reduced to a minimum.

The companion plate 15 occupies a corresponding position on the opposite side of the frame member 6, and extends parallel to the integral plate 11. This outer plate 15 has somewhat the same general contour as the integral plate 11, but differs therefrom in the following essential details. In the first place, it is detachably connected to the supporting member or cylinder 3, and secondly, is provided with a centrally located bore 16 through which the end of the pivot bolt passes, rather than the open slot or hook construction of its companion plate 11. Furthermore, it is provided with a rearwardly extending arm 17 serving a definite purpose hereinafter to be set forth. The plate 15 is generally triangular in shape, as clearly shown in Figs. 2 and 6, its base being arranged vertically and in parallel relation to the cylinder 3, and tapering rearwardly to an apex located beyond the bore or bolt hole 16. The outer surface of the plate 15 is provided with a triangular shaped depression 18, thus forming the marginal reinforcing bead, as clearly shown in Fig. 6. Furthermore, an annular depression 19 surrounds the opening 16, thus providing a decreased thickness of metal immediately adjacent thereto. The plate 15 is connected to the cylinder 3, and clamped against the outer face of the frame head 7 by means of bolts 20—20 which extend transversely through the upper and lower corners of the plate, through integral ears 21—21 projecting from the surface of the cylinder 3, and in registering relation with the bolts 20, and similarly through holes drilled in the integral plate 11. Furthermore, the centrally disposed hole 16 of the plate 15 engages the outer end of the pivot bolt 9, the mounting of said plate 15 upon the pivot bolt and the connecting of the same to the cylinder and the integral plate 11 being accomplished simultaneously and in the act of attaching the bracket to the frame member. Manifestly, the spacing of the plates 11 and 15 is dependent upon the transverse dimension of the frame head 7, and any necessary lateral adjustment is provided for by placing the required number of washers 22 upon the bolts 20—20 between the plate 15 and the integral ears 21—21, as shown in Fig. 3. Having determined the required amount of lateral adjustment, the plates are drawn tightly toward each other by taking up on the bolts 20—20 in the usual manner.

In order to apply the bracket, the nut which ordinarily surmounts the outer end of the pivot bolt 9 is removed, and the bolt itself displaced to the left, as shown in Fig. 5, thus permitting the integral plate 11 to be hooked over the end of the bolt in the manner already suggested. This having been completed, the outer plate 15 is mounted in place and the bolts 20—20 inserted and tightened. In many instances, the lateral displacement of the pivot bolt 9 will decrease the projecting threaded end portion to such an extent that the original nut could not safely be replaced with any degree of certainty that the remaining threads would hold it. For this reason, it is proposed to provide a special nut 10, as shown in Fig. 5, this nut being in the nature of a screw cap having a projecting sleeve or extension 10$^a$ adapted to telescope within the hole 16 in the plate 15. Furthermore, a set screw 23 is provided in the nut 10 for the purpose of securing the same to the threaded end of the pivot bolt 9. By the provision of this special nut, an increased threaded engagement is obtained, thus compensating for the shortening of the bolt by reason of its lateral displacement to receive the plate 11 of the bracket.

To provide for the vertical adjustment of the bumper, which would obviously be accomplished by rotating the plates 11 and 15 of the bracket about the pivot bolt 9, the arm 17 heretofore referred to, is utilized. This arm is integral with the plate 15, and projects from the rear end or apex thereof, terminating in an eye 17$^a$. Immediately above the end of the arm 17, an eye-bolt 24 is mounted in the frame member 6, and extending between said eye-bolt and the eye 17$^a$ of the arm 17 is a vertical adjusting bolt 25 capable of being lengthened or shortened by means of a nut 26 mounted at its lower end. In the obvious manner, the plate 15 can be rotatively adjusted about the pivot bolt 9, and similarly, held in adjusted position by means of the adjusting bolt 25 just described.

In Figs. 7, 8, and 9, is illustrated a modification of the construction already described, wherein a departure from the preferred construction is disclosed, which pertains wholly to the plate corresponding to the integral plate 11 of the previous construction. In short, a departure consists of providing a detachable plate 27 (Fig. 9) which is constructed in all respects in the same manner as the plate 11, except that it is not integral with the cylinder or supporting member 3, but is detachably connected thereto in the same manner as is the outer or companion plate 15; namely, by the provision of ears 28 cast integral with the cylinder 3, and corresponding to the ears 21 associated with the plate 15. By this construction, the plates 15 and 27 may be applied to the frame independently of the supporting member 3, the latter being subsequently attached by means of the same arrangement of bolts 20—20 as previously described. Furthermore, lateral adjustment is now possible between the cylinder 3 and both members of the attaching bracket by use of washers 29 between the plate 27 and the ears 28, as well as the washers 22 before mentioned.

In some instances, the modified construction would be preferred, in that it permits a greater degree of lateral adjustment, thus allowing the cylinder or supporting member 3 to be more accurately centered midway between the ends of the frame head 7. Otherwise, the two structures are quite the same in purpose and function.

A bracket constructed in this manner has certain advantages, among which may be mentioned the convenient manner of attachment, the rigidity and strength of the bracket itself, and the ample degree of adjustability permitting the application of the bracket to different makes of vehicles.

The provision of the open slot in one of the plates obviously eliminates the necessity of removing the pivot bolt in order to attach the bracket, this being necessarily a difficult operation, inasmuch as it involves disconnecting the frame member and spring, which parts must be held in alinement during the removal and replacement of the bolt. By the present construction, the bolt need only be displaced slightly to permit one side of the bracket to be hooked over the end of the bolt.

Furthermore, the triangular shape of the plates provides the maximum strength and resistance against stresses transmitted thereto from the supporting cylinders of the bumper, and especially where the force of impact exerts a torsional strain upon the bracket in addition to a direct thrust by reason of the action of the shock absorbing member; namely, the torsional springs mounted within the cylinders 3—3.

In spite of the fact that the bracket is disclosed in close association with a cylinder forming a part of a particular type of bumper, it is obvious that in so far as the bracket proper is concerned, it may equally well form a part of any other bumper supporting member, or even be directly connected to the impact bar of a bumper by means of suitable connecting members. For this reason it is not desired to limit the invention to the particular combination of parts illustrated and described, except in so far as the combination is set forth in the appended claims:

1. In a bumper, the combination with an impact bar, and means for attaching the same to a vehicle frame member comprising plates adapted to be clamped together on opposite sides of the frame member, one of said plates being provided with an opening adapted to engage one end of a pivot bolt passing through the end of said frame member, and the other plate having an open slot adapted to engage the opposite end of said pivot bolt.

2. In a bumper, the combination with an impact bar, and means for attaching the same to a vehicle frame member comprising plates adapted to be clamped together on opposite sides of the frame member, one of said plates having an opening therein adapted to engage one end of a pivot bolt passing through the end of said frame member, the other of said plates being provided with an open slot permitting a hooked connection with the opposite end of said pivot bolt.

3. In a bumper, the combination of an impact bar, supporting members connected with said impact bar, and means for attaching said supporting member to a vehicle frame member comprising a pair of plates adapted to be clamped on opposite sides of the frame member, one of said plates having an open slot therein adapted to hook over the adjacent end of a pivot bolt passing through the end of said frame member, the other of said plates having an opening through which the opposite end of said bolt passes, and means permitting lateral adjustment between said plates.

4. In a bumper, the combination of an impact member, a supporting member connected with said impact member, and a bracket connected to said supporting member and adapted for attachment to the frame member of a vehicle, said bracket comprising companion plates adapted to be clamped together on opposite sides of the frame member, and to engage a pivot bolt passing therethrough, one of said plates having an open slot permitting the plate to be hooked over the end of said bolt, in attaching the same thereto.

5. In a bumper, the combination of an impact member, a supporting member and means for attaching said supporting member to the frame member of a vehicle, comprising companion plates adapted to engage opposite sides of said frame member, and a pivot bolt passing through the end thereof, a bolt extending laterally between said plates and connected with said supporting member, one of said plates being provided with an open slot permitting the same to have hooked connection with the adjacent end of said pivot bolt.

6. In a bumper, the combination of an impact member, a supporting member and means for attaching said supporting member to the frame member of a vehicle, comprising companion plates adapted to engage opposite sides of said frame member, and a pivot bolt passing through the end thereof, one of said plates being integral with said supporting member, and provided with an open slot therein engaging the adjacent end of said pivot bolt.

7. In a bumper, the combination of an impact member, a supporting member and means for attaching said supporting member to the frame member of a vehicle, comprising companion plates adapted to engage opposite sides of said frame member, and to engage a pivot bolt passing through the end thereof, one of said plates being integral with said supporting member, a bolt passing through the other of said plates and anchored in said integral plate, and means for adjusting said plates laterally with respect to each other, and means for rotatively adjusting said plates about said pivot bolt.

8. In a bumper, the combination of an impact member, a supporting member and means for attaching said supporting member to the frame member of a vehicle, comprising an ear integral with said supporting member, and formed to hook over one end of the pivot bolt passing through the end thereof, and a plate bearing against the opposite side of said frame member, and engaging the adjacent end of said pivot bolt, and bolts passing transversely between said plate and ear.

9. In a bumper, the combination of an impact member, a supporting member provided with an integral ear adapted to engage one end of a pivot bolt passing through the end of a vehicle frame member, a plate detachably connected with said supporting member and engaging the opposite end of said bolt, said ear and plate being provided with openings to receive said bolt, one being an open slot permitting attachment without removal of said bolt.

10. In a bumper, the combination of an impact member, a supporting member and means for attaching said supporting member to the frame member of a vehicle, having a pivot bolt passing through the end thereof, comprising companion plates adapted to engage opposite sides of said frame member, and provided with openings through which the ends of said pivot bolt project, and a nut adapted to surmount one end of said bolt and provided with a threaded extension adapted to have telescoping engagement with one of said plates.

11. In a bumper, the combination of an impact member, a supporting member connected with said impact member, and a bracket connected to said supporting member and adapted for attachment to the frame member of a vehicle, said bracket comprising companion plates adapted to be clamped on opposite sides of the frame member, and to engage a pivot bolt passing therethrough, one of said plates having an open slot permitting the plate to be hooked over the end of said bolt, and a removable nut adapted to surmount one end of said bolt, and provided with a threaded extension having telescoping engagement with the adjacent plate.

In witness whereof, I hereunto subscribe my name this 29th day of January, A. D., 1921.

LEROY BAUMGARTL.